May 25, 1937. W. TAMMINGA ET AL 2,081,650
SANITARY LIQUID DISPENSER
Filed Feb. 4, 1935 2 Sheets-Sheet 1

INVENTORS
WILLIAM TAMMINGA
OTTORINO BONOMI
ROBERT E. CORRADINI
HOWARD M. JONES
BY S M Prieler
ATTORNEY.

Patented May 25, 1937

2,081,650

UNITED STATES PATENT OFFICE 2,081,650

SANITARY LIQUID DISPENSER

William Tamminga and Ottorino Bonomi, New York, and Robert E. Corradini, Bronx, N. Y., and Howard M. Jones, Huntington, W. Va.; said Tamminga, Bonomi, and Jones assignors to said Corradini Application February 4, 1935, Serial No. 4,734

22 Claims. (Cl. 226—116)

This invention relates to sanitary liquid dispensers and is particularly concerned with devices for dispensing milk and similar emulsion-like liquids.

It is among the objects of the invention to provide an improved sanitary liquid dispensing device which maintains the liquid stored in a container at uniform consistency and which has simple and readily accessible parts that can be readily maintained in sanitary condition and will prevent contamination or deterioration of the dispensed liquid.

The foregoing and other objects of the invention will be best understood from the following description of exemplifications thereof, reference being had to the accompanying drawings wherein.

For many years milk has been known as one of the most essential foods. Many efforts have been made to devise a way for easy and sanitary dispensing of milk to permit its wide distribution in the way it is done with other drinking substances. The provision of a practical milk dispenser presented great difficulties.

Milk is a good breeding substance for bacteria and accordingly the dispensing devices must prevent contamination of the milk during its storage in the container from which it is dispensed as well as incident to the dispensing operation. Milk is an emulsion and the cream dispersed therein tends to separate from the main body of the liquid. In order to be practical the dispensing device must maintain the stored milk that is to be dispensed at uniform consistency, and the dispensing device must in all its parts positively protect the milk against contamination and deterioration.

In accordance with the invention, the parts of the milk dispensing device through which the milk flows are made simple and easy to clean and combined as a unit with the can, in which the milk that is to be dispensed is held, to permit cleaning of the dispensing part in the same sanitary way as the can is cleaned. The dispensing head has simple and straight discharge ducts and all its parts are readily accessible for cleaning and scrubbing. In order to dispense the liquid, the dispensing head is withdrawn from the milk can while maintaining its discharge duct connected with the bottom portion of the milk container. In the dispensing position the dispensing head is detachably connected to a dispensing stand by means of which motive power is controlled to discharge a predetermined quantity of milk through a fully protected discharge duct and to maintain the milk in the can in a uniform condition by periodic agitation with highly purified air discharged into the stored milk through the milk discharge duct.

The invention will now be described in connection with an exemplification thereof, shown in Fig. 1 of the drawings. Inside a refrigerator casing 10, which is maintained at the proper temperature suitable for conditioning the milk, is positioned a large milk can 11 of conventional construction having a neck 12 closed with a cover 13 which forms a relatively large compartment 14 which may be in turn enclosed by a second outer cover 15. The two covers may be of the usual construction and are preferably provided with sealing locking lugs which may be locked and sealed by means of a lock 17 as indicated in the drawings. The outer cover 15 is usually removed before inserting the can 11 into the refrigerator 10 so as to expose the interior of the cover compartment 14.

The top wall of the refrigerator 10 has a large opening 20 which is enclosed by the base plate 21 of a dispensing stand 22, a hollow standard 22' extending above the base plate and carrying at its upper end a supporting plate 23 overhanging the space above the refrigerator opening.

Under normal operating conditions the supporting plate 23 of the stand 22 has attached thereto the dispensing plate 27 of a dispensing head 28 by means of a threaded bolt 29 secured by a bolt nut 30 to the supporting plate 23. The dispensing plate 27 is provided with an inclined discharge duct 31 terminating in a discharge opening 32 on the underside of the dispensing plate 27 and an adjoining vertical discharge duct 33 from which extends a tube 35 that is slidably movable through a connecting bushing 37 mounted in the wall of the inner cover 13 of the can that has a downwardly extending outer tube 39 reaching to near the bottom 40 of the milk can 11. The two discharge ducts 31 and 32 are straight and have at their upper junction a cleaning port 42 which is closed by a readily removable cover 44 to permit easy cleaning of the two straight discharge ducts 31, 33 of the dispensing head. The front side of the standard 22' and the portion of the base plate 21 underlying the base plate have suitable openings 36 for permitting movement of the dispensing head 28 from the position in engagement with the supporting plate 23 as shown in full lines to the dotted line position 28' in the compartment 14 of the cover, while the discharge tube 35 slides downwardly through the outer tube 39 into the interior of the milk can 11.

The dispensing head 28 may be quickly detached from the supporting plate 23 by unscrewing the nut bolt 30 and pushing the dispensing head 28 to the dotted line position 28', or moved from the dotted line position 28' within the cover to its position in engagement with the supporting plate 23 to which it is attached by the bolt nut 30. The tube 35 may be locked in place and sealed tightly by means of a packing 46 and a threaded lock cap 47. Under normal operating conditions the openings 36 in the base plate and the front side of the stand 22 are enclosed by a removable base cover 48 so that the interior of the refrigerator and the adjoining hollow space of the stand 22 are closed.

The underside of the dispensing plate 27 is provided with an annular recessed seating face 51 to which is fastened a detachable sealing ring 52, of suitable sealing material, such as rubber. In the portion of the base cover 48 underlying the dispensing plate 27 is mounted a tubular supporting member 55 provided at its upper end with a vessel holder 56 holding a vessel 57 into which the milk is to be dispensed. The holder is pressed upwardly by a helical spring 58 held in place by an enclosure 59 attached to the underside of the base cover. The extent of the upward movement of the tubular supporting tube 55 is made sufficient to permit placing of vessels 57 of varying lengths that are to be filled with milk below the sealing ring, and the force of the spring is made sufficient to provide a tight sealing joint between the upper edge 61 of the vessel 57 and the portion of the sealing ring 52 against which it is seated.

In the central portion of the dispensing plate 27 is provided a suction air passage 65 opening into the space on the top of the vessel 57 into which the discharge duct 31 opens. The other end of the air passage 65 is connected through a suction passage 67 of the supporting plate 23, and the suction passages of suction valve unit 68 to an air tube 69 leading to a control valve 70 by means of which the air tube 69 may be connected either to the suction opening 71 or to the compression opening 72 of a rotary air pump 74 driven in the direction indicated by arrow 75 by the electric motor 76.

The valve unit 68 has an over-flow chamber 80 through which air as well as any liquid coming into the chamber is free to pass into the adjoining float chamber 81 having mounted therein a float 82 which is lifted by liquid entering into the float chamber to seal the opening 83 thereof and prevent passage of air as well as fluid through the valve unit.

Under normal conditions, when the float is in its downward position, the float chamber 81 is connected through its opening 83 to an air filter chamber 85 which leads through a one way ball valve 86 to air tube 69, the ball valve being arranged to be kept open when air is sucked in by air tube 69, thereby keeping open the passage between tube 69 and the suction passage 65 of the dispensing plate, and to close the passage if compressed air is supplied by air tube 69, preventing the compressed air from flowing into the suction passage 65 of the dispensing plate. To keep the connections of the passages air tight, a layer 23' of sealing material, such as rubber, is placed at the junction between the dispensing plate 27 and the supporting plate 23.

The control valve 70 may be made in the form of a small tubular casing with an exhaust opening 91, a compression opening 92 and suction openings 93, 93' which are controlled by a slide 94 having two control pistons 95 and 96 movable between the upward position in which they are held by spring 97 and the downward position indicated in dotted lines 95', 96' which they occupy when the slide 94 is pressed down. The compression opening 92 of the valve is connected to the exhaust opening 72 of the air pump 74, and the suction inlet 93 of the control valve is connected through a second air filter 99 to the suction inlet 71 of the air pump 74.

Figures 1, 2:
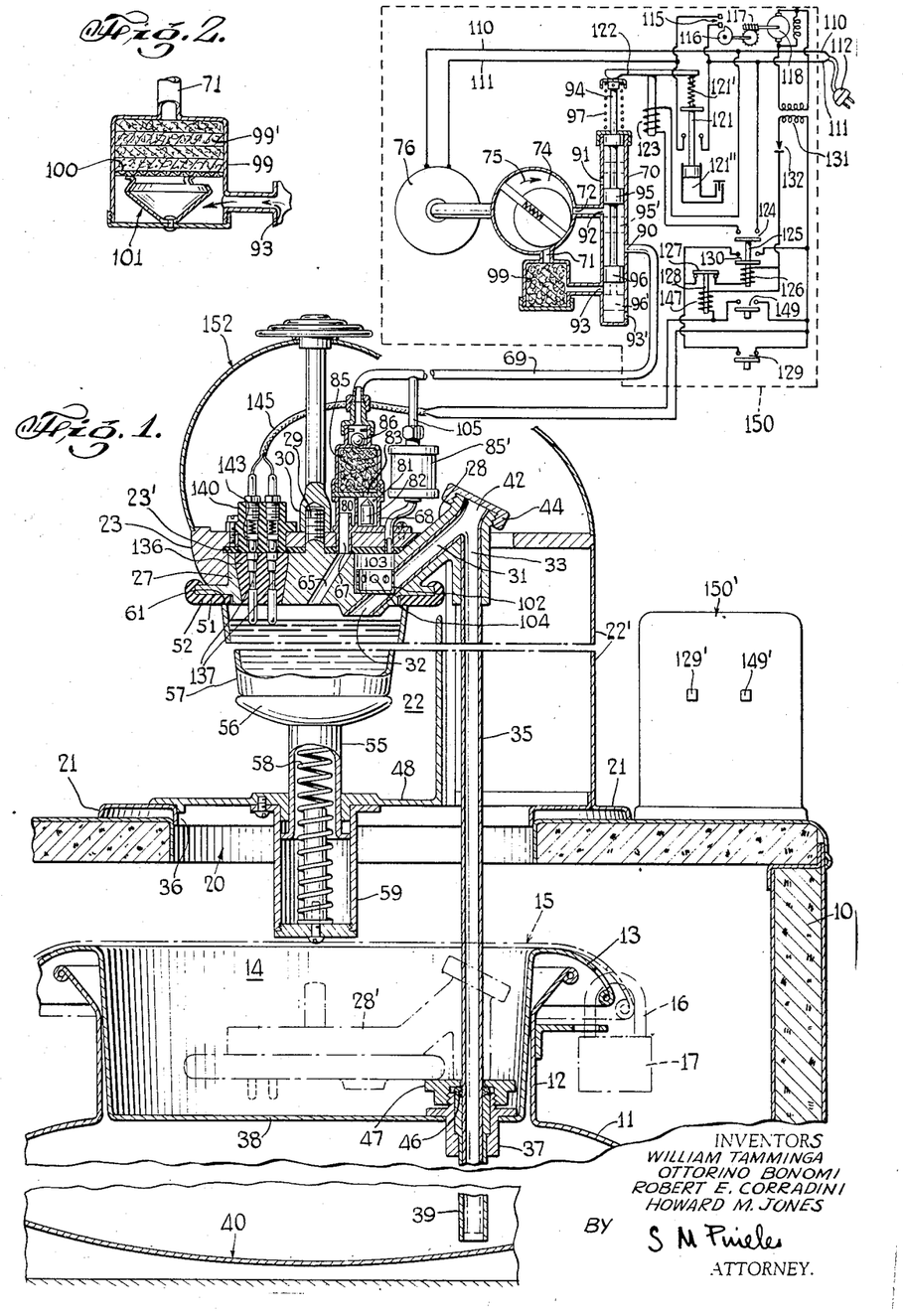
Fig. 1 is a diagrammatic view, with some parts shown in section, illustrating a milk dispensing device exemplifying one embodiment of the invention.
Fig. 2 is a sectional detailed view of the air filter used in the device.

The inclined discharge duct 31 of the dispensing head is provided near its outlet opening 32 with a hollow cylindrical valve 102 of light weight, that is readily lifted by the suction in the space above it along the cylindrical surface of the valve chamber 103 from its lower position in which it is shown in Fig. 1, in which it seals the outlet opening 32 against the duct 31 and in the chamber 103, but permits flow of compressed air through an opening 104 from the chamber 103 into the discharge duct 31. The upper end of the valve chamber 103 is connected through a filter 85', like the filter 85, and a branch tube 105 with the air tube 69 leading through the control valve 70 to the air pump 74.

The electric motor 76 which operates the air pump 74 is connected to be energized from two line conductors 110, 111 leading to a conventional double line electric current supply plug 112. In accordance with the invention, the motor circuit is arranged to be periodically energized by a clock-operated energizing circuit including a set of contacts 115 connected in line conductor 111, for instance, the closure of the contacts being controlled by any suitable constant speed motor shown diagrammatically, as a cam 116 driven through a speed reduction gearing 117 by a small constant speed electric motor 118 which is continuously connected to the live parts of the line conductors 110 and 111.

In the preferred arrangement of the invention, the motor 118, the gearing 117 and the cam 116 are so designed to close contacts 115 once every 5 or 6 minutes and keep the contact closed for about 10 seconds, energizing the motor 76 for 10 seconds every 5 or 6 minutes and thereby causing the air pump 74 to operate for about 10 seconds every 5 or 6 minutes.

There is also provided a second energizing circuit for the pump motor 76 at contacts 121 of a dispensing relay 122 which is normally in the position shown in the drawings and operates to close contacts 121 and move the plunger 94 to its downward position upon energization of its actuating coil 123 at the contacts 124 of a master relay 125. The master relay 125 is normally in its open position shown in Fig. 1 and is actuated to move to its closed position upon energization of its actuating coil 126 over the normally closed lock-out contacts 127 of lock-out relay 128 and the normally open contacts of the normally open dispensing switch 129 through an auxiliary low voltage transformer 131 and a rectifier connected to the two live parts of the supply conductors 110 and 111. The step-down transformer 131 and the rectifier 132 are shown for illustrative purposes to indicate that for the control of the operation of the dispenser, a low voltage direct current source may be used so as to avoid having any of the parts handled by the operator carrying full line potentials.

Once the dispensing switch 129 is momentarily closed, an energizing circuit is established through the actuating coil of relay 126 of the master relay 125 closing the energizing circuit of the dispensing relay 123, thereby starting the pump motor 76 and bringing down the slide of the control valve 70. The master relay 125 has also a set of lock-in contacts 130 which automatically establish an independent energizing circuit for its actuating coil 126 in parallel to the contacts of the dispensing switch 129 so that a dispensing operation can be started by merely momentarily closing the contacts of switch 129 and then immediately releasing it.

A distinct feature of the invention is an arrangement for automatically stopping the flow of the milk to the receiving vessel 57 at a predetermined stage or condition of the flow of the milk. To this end the head plate 27 has mounted therein an electrode insert 136 of tight and wear-resisting insulating material, such as porcelain or synthetic resin, which has imbedded therein two immersion electrodes 137 having downwardly extending ends projecting to a level at which the flow of milk is to be stopped. The upper ends of the electrodes 137 are connected by means of a terminal plug 140 with two resiliently pressing contact members 143 connected through leads 145, actuating coil 147 of the lock-out relay 128, to the low voltage supply circuit, when the milk rises to a level at which it completes a conducting connection between the lower ends of the electrodes 137.

As soon as the conducting connection across the electrodes 137 is established, the lock-out relay 128 is actuated, opening at contacts 127 the energizing circuit of coil 126 of the master relay 125 and thereby releasing the instantaneously opening contacts 124 of the dispensing relay 123 permitting the plunger of the control valve 94 to instantaneously return to its upward position, and while the contacts 121 operated through a spring 121' and dashpot 121" open after a delay of several seconds, the energizing circuit of the motor continues to run for a short instant after the plunger 94 of control valve 70 returns to its upward position, discharging compressed air by way of air tube 69 and discharge ducts 31 and 33 into the milk can. An auxiliary switch contact 149 connected in parallel to the immersion electrodes 137 permits instantaneous stoppage of the dispensing action by independently closing an energizing circuit for the coil 147 of the lock-out relay 128.

As indicated in Fig. 1 by the dotted line 150, the motor with the associated relays, valves and conductors are all enclosed in a small casing 150' which may be mounted on the top of the refrigerator box 10 back of the dispensing stand 22, the dispensing switch and the auxiliary switch 149 being mounted at a convenient place, suitable buttons 129', 149' for actuating either the dispensing switch 129 or the cutout switch 149 being provided on the exterior of the housing or on the dispensing stand.

To give the exterior of the dispenser good appearance, the parts mounted on the top of the supporting plate 23 are enclosed by a cover 152 which is held in place by means of the upper end of the screw bolt 30 with which the dispensing head is attached to the supporting plate. While the conductors 145 and the tube 69 are shown diagrammatically as passing through the cover, they are preferably led through the hollow standard 22 and the rear portion of the base plate 21 into the casing 150.

The operation of the device is as follows: Under normal conditions the several parts are arranged in the way shown in full lines in Figs. 1 and 2. The can 11 with the milk is enclosed in the refrigerator 10 and is maintained at the proper temperature. Under ordinary conditions when no dispensing takes place, the motor circuit will be open at the contacts 115 and contacts 121; all the relay contacts will be de-energized, and only clock motor 118 is energized; the slide 94 of the control valve 70 is in its upward position, and the float 82, directional valve 86 and the suction valve 104 are in their downward positions.

If no dispensing operation is initiated, the clock motor 118 will complete one rotation of the cam 116 at the end of each predetermined time setting, for instance, after each 5 or 6 minutes, and close its associated contacts 115 for about 10 to 15 seconds. Each time the clock contacts 115 are closed, the motor is kept energized for a short period of time, of about 10 seconds, and drives the pump 74 sucking in air at the suction inlet 71 and delivering compressed air at its outlet 72. Air which is free to enter into the pump 74 through the lower open end of the valve casing 70 is compressed by the action of the pump 74 which delivers compressed air through valve outlet 90, air tube 69, tube branch 105, valve chamber 103, valve openings 104, discharge duct 31, down through discharge tube 35, through the cover and the end of the outer tube 39, to the bottom of the milk can, stirring up the milk and agitating it to maintain the milk in a fully emulsified state and at uniform consistency.

Tests have shown that by discharging compressed air into the space near the bottom of a can holding milk for periods of about 10 seconds every 5 or 6 minutes, the milk throughout the entire can will remain of uniform consistency. Tests have also shown that the condition of the milk will not in any way be affected by the discharge of air from the pump into the milk if the air discharged into the milk is passed through a filter which frees the air from dust.

In the arrangement of the invention, filtration of all the air discharged into the milk is normally secured by a filter 99 placed in front of the suction inlet of the pump, the filter being filled with a porous body of gauze of filtering texture which filters dust and permits only air that is purified to pass into the pump and therethrough by way of the air pump 74 into the milk can for agitating the milk.

The filter 99 is shown in detail in Fig. 2 and consists of a compartment enclosing a plurality of layers of filter texture 99' held in place by a perforated sheet 100 and a conical air guide 101 secured to the detachable cover of the compartment. Air entering from valve opening 93 into the filtering compartment 99 is distributed by the guide 101 and flows by way of the perforations of sheet 100 through the layers of filter texture 99' into the inlet of the suction pump 74.

In a dispensing device of the type described herein, used in connection with a milk can about two feet high and holding about ten gallons of milk, and an air pump adjusted to produce a suction pressure corresponding to several inches of mercury sufficient to lift the milk into the discharge vessel, the air pump may be arranged to deliver the agitating air at an average rate of about one-half cubic foot per minute.

The filter used in connection with the device contains several layers of fluffy cotton texture forming a filter body about one-half inch high, the filter layers consisting of standard commercially available filtering textures for air cleaning purposes.

Milk subjected to periodic agitation by air passed through a filter as described herein retains its highly sanitary condition in which it is originally placed in the can.

This agitation is periodically repeated by the action of the clock contacts 115, and throughout the time the dispenser is in service the milk is continuously maintained in a uniform condition ready for dispensing.

Whenever a desired quantity of milk is to be dispensed, a vessel of the desired content is placed on the seat 56 of the dispensing stand, the spring 58 holding it with slight pressure against the seating surface 52. The dispensing switch 129 is then momentarily closed, energizing in quick sequence the coils 126 and 123 of the master relay 125 and dispensing relay 122, instantaneously closing the energizing circuit for the pump motor 76 at contacts 121 and bringing down the plunger 94 of the control valve 70 to the downward position. In its new position, the control valve 70 provides an outlet for the compressed air of the pump 72 through the upper outlet opening 91 of the valve casing 70 and connects the suction inlet end 71 of the pump by way of the lower valve openings 93 and 90 of the valve casing 70 to air tube 69. The suction in tube 69 pulls up the valve 102 in the head plate 27 to its upper position opening the downward end of the discharge duct 31. At the same time the suction in the air tube 69 opens the valve 86 and exercises a suction force through the passage over the filter 85, the open chambers 81 and 80, passages 67 and 65, into the space within the vessel 57 which is held sealed against the seating surface 52, and therethrough by way of the open ducts 31, 33, tubes 35, 39, on the milk in the can. This suction force draws up the milk through the tubes 39 and 35 into the discharge duct 31 and discharges it through opening 32 into the vessel 57. This action takes place instantaneously because even with a small air pump the required suction force can be readily created in the space above the vessel to quickly start the flow of the milk into the vessel. This suction continues until the milk has reached the level where the milk touches the two downward ends of the immersion electrodes 137 of the head plate 27 causing instantaneous energization of the coil 147 of lock-out relay 128, de-energizing in turn the coil 126 of the master relay 125 and thereby opening at contacts 124 the energizing circuit of the relay 122 which quickly returns the valve plunger 94 to its upward position connecting the pump to its normal agitating position. The motor contacts 121 are delayed in opening by the action of the spring 121' and dashpot 121" causing the pump to discharge compressed air through the ducts 31, 33, tubes 35, 39, cleaning the milk passage from any milk remnants and agitating the milk.

The device described above will also operate without unidirectional valve 86 and the suction valve 82, with an arrangement in which the two valves 102 and 86 are eliminated and the discharge duct 31 of the dispensing head extends directly to the opening 32 into the space above the vessel, and the air channel 65 is at all times normally connected through passages 67, 80, 81, 85 and tube 69, and control valve 70 to the pump 74. With such arrangement automatic and periodic agitation by means of the clock contactor 115 will take place exactly in the way described above, the air for agitation being sucked in through the lower opening 93' of the valve 70 by way of dust filter 99 through the suction inlet 71 of the pump, and after compression by the pump discharge through opening 72, valve openings 92, 90, air tube 69, passages 85, 81, 80, 67, 65, through the space above a vessel, which is under such conditions normally left seated in position against the seat, and through the space of the vessel by way of the open duct 31, duct 33, tube 35 and tube 39 to the bottom of the milk can where it is discharged for a sufficient period to maintain the uniform consistency of the milk in the milk can unit. Dispensing will take place in exactly the same way as before and the dispensing will be cut off at the instant when the level of the milk will establish contact between the two cut-off electrodes 137 from the two depending immersion electrodes of the dispensing head.

Figure 3:
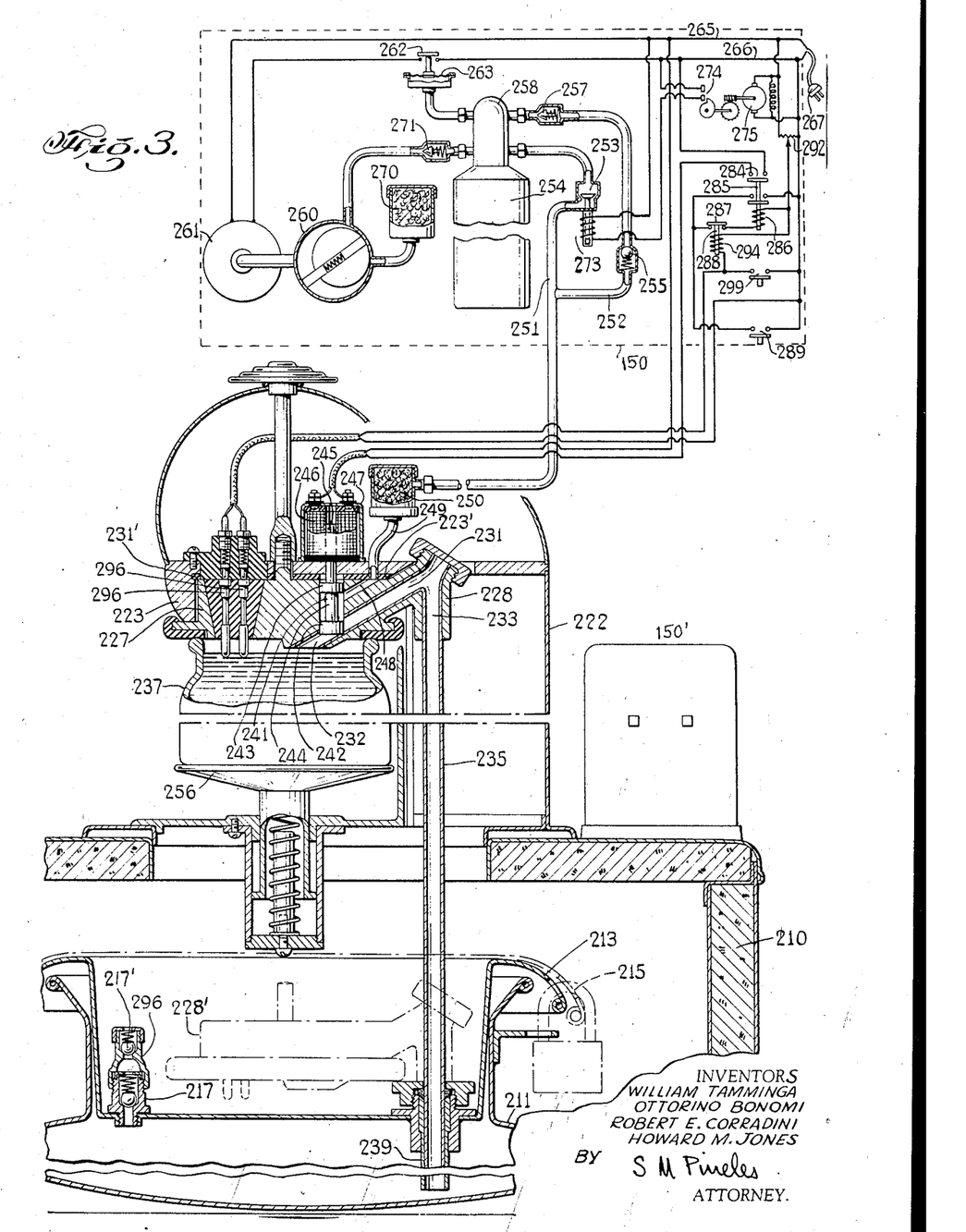
Fig. 3 is a view similar to Fig. 1 of another embodiment of the invention.

In Fig. 3 is shown a milk dispensing device exemplifying another form of the invention in which compressed filtered clean air or other suitable gas is used for supplying the force for discharging the milk through the special protected milk discharge duct of a dispensing head combined as a unit with the can in the way explained in connection with the exemplification of Fig. 1, and also for the periodic agitation of the milk in the can by discharging the air through the milk discharge duct into the milk container.

The refrigerating unit 210, the can 211 and the covers 213 and 215, and the dispensing head 228 with the stand 222, are similar to corresponding parts described in connection with Fig. 1, except that the cover 213 tightly seals the interior of the milk can 211 maintaining therein a substantial pressure sufficient to lift the milk through the tube 235 into the discharge duct 231 for delivering it to the vessel 237 held on a support, like in the arrangement of Fig. 1. In addition, the cover 213 which seals the milk can 211 has a pressure valve 217 for releasing excessive pressure from the can so that excessive pressures above the predetermined pressure required to lift the milk for discharging it through discharge duct 231 is permitted to escape from the milk can, discharge valve 217 closing automatically when the proper air pressure within the milk can is reached. Furthermore, a groove is provided on the undersurface of the dispensing head against which the top of vessel 237 abuts to permit free escape of compressed air entering the vessel.

The inclined discharge duct 231 in the dispensing plate 227 of the dispensing head is provided near its outlet opening 232 with a slide valve 241 having two piston portions 242, 243 movable in a cylindrical valve chamber 244 of the dispensing plate 227 between the full line position shown in the drawings and the upper position to which it is pulled by a magnetic plunger 245 that is actuated by a coil 246 like in ordinary relays. The coil is mounted within an air tight enclosure 247 attached to the top of the supporting plate 223, the junction between the supporting plate 223 and the dispensing plate 227 being provided with a layer of packing 223' to seal up the air passages.

In its normal downward position the slide valve 241 closes the milk discharge opening 232 and provides an air channel from the discharge duct 231 through air passage 248, tube 249, air filter 250 to two branch tubes 251, 252. Branch tube 251 leads through agitation valve 253 to a high pressure air tank 254 to which the other branch tube 252 is connected through a back pressure valve 255 and a pressure reducing valve 257. The tank 254 is designed to hold compressed air or another suitable gas and is provided with a head 258 to which are connected the two valves 253 and 257.

The tank 254 may be supplied with compressed air by means of an air compressor 260 driven by an electric motor 261 arranged to be energized by the contacts 262 of a pressure relay 263 through electric current supply conductors 265, 266 leading to a conventional supply plug 267. The pump 260 sucks air through a filter chamber 270, like that of Fig. 1, and delivers it under pressure to the pressure tank 254 through a one way valve 271. The pressure responsive relay 263 is shown conventionally in the form of a tensioned diaphragm enclosing a chamber connected to the tank to cause the closure of the relay contacts 262, if the pressure of the tank falls below a predetermined value, starting the motor and operating the pump 260 until the pressure in the tank has been built up to the required value, whereupon the pressure relay 263 opens the contacts 262, interrupting the circuit to the compressor motor 261 and leaving it in inoperative condition until the pressure again falls below the predetermined value.

The agitation valve 253 is actuated like an electric relay by a relay coil 273 which is connected to the supply line conductors 265, 266 by means of a pair of clock contacts 274 actuated by a clock motor 275 like in the arrangement of Fig. 1. The coil 246 which pulls the slide valve to its upper position may be energized by contacts 284 of a master relay 285 actuated by a coil 286 over the normally closed lock-out contacts 287 of lock-out relay 288 and normally open contacts 289 of a dispensing switch which connects the coil to the low voltage end of a potential-reducing potentiometer 292 energized by the two line conductors. Like in the arrangement of Fig. 1, the lock-out relay 288 has a normally de-energized actuating coil 294 which is energized from the low voltage end of the potentiometer 292 by the two immersion electrodes 296 when the milk in the vessel 237 reaches a level at which it completes the circuit between the two electrodes. The lock-out relay 288 may also be independently energized by auxiliary contacts 299 to open the energizing circuit of the valve actuating coil 246.

Assuming that the pressure relay 263 of the pressure tank 254 is set to maintain in the tank 254 an air pressure of about 30 pounds, and the reduction valve 257 is set to deliver through valve 255 air at a pressure of about 2 pounds which it is desired to maintain inside the milk can 211, and the outlet valve 217 of the milk can is set to release air from the top of the milk can when the pressure therein rises above about 2 pounds per square inch, the operation of the device shown in Fig. 3 will be as follows: Under normal conditions the several parts are arranged in the way shown in full lines. When no dispensing takes place, the tank 254 will be maintained at a predetermined pressure of about 30 pounds. Air of reduced pressure will be supplied by the reducing valve 257, through the passage leading over valve 255, tube 252, filter 250, tube 249, passage 248, supply plate duct 231, vertical discharge duct 233, and into the milk can, the air bubbling through the bottom of the discharge tube 239 and filling the space on the top of the can until the pressure above the milk in the can has reached a pressure of about 2 pounds. The reducing valve 257 thus maintains in the air space of the can above the milk a pressure of about 2 pounds irrespective of the operation of the other elements of the device.

In addition, compressed air is periodically supplied at full, or suitably reduced, pressure from the pressure tank 254 by way of the agitation valve 253, through filter 250, air tube 249, passage 248, dispensing head ducts 231, 233 and tubes 235, 239 to the bottom portion of the milk can. The compressed air discharged near the bottom of the milk can at high pressure agitates the milk as it passes upwardly to the space within the can above the milk, and if the air in this space is excessively increased the excess of the compressed air leaves the tank through the discharge valve 217. This agitation process is repeated in periodic intervals determined by the operation of the clock motor 275, for instance, by closing the contacts 274 every 5 minutes for 5 to 10 seconds. As a result the milk in the can is maintained at a uniform consistency.

In order to dispense milk the dispensing switch 289 is momentarily closed. This actuates the master relay 285 which closes its contacts 284, thereby energizing the actuating coil 246 of the dispensing valve 224, lifting it to the upper position where it closes the passage 248 leading to the pressure tank and opens the liquid discharge passage 231 to permit discharge of milk through the opening 232. A milk receiving vessel 237 which is placed in position below the discharge opening 232 receives milk flowing through the tubes 239 and 235, ducts 233 and 231, under the action of the compressed air in the milk can into the space above the milk, until the vessel 237 is filled up to the level where the milk reaches the downward ends of the two immersion electrodes 296. As soon as the milk flowing into the vessel 237 establishes contact between the two immersion electrodes 296, the lock-out circuit through coil 294 of the lock-out relay 288 is completed, opening the lock-out contacts 287 and de-energizing the master relay 285 which opens at its contacts 284 the energizing circuit of valve coil 245, permitting the slide valve 244 to return to its downward position where it closes the outlet opening 232 of the liquid discharge duct. Since the pressure in the container is now smaller than in the space of the dispensing plate passage 248 connected to the milk discharge ducts 231, 233, air will be discharged through these ducts into the milk can cleaning the passages of milk remnants. Like in the device of Fig. 1, the dispensing can be stopped at any time before the milk in vessel 237 reaches the level of the immersion electrodes by closure of the auxiliary switch contacts 299.

During the initial period of dispensing milk from a full milk can 211, the space in the can on the top of the milk may not have sufficient air at its normal pressure, of 2 pounds, for instance, for dispensing the required amount of milk by the action of the compressed air on the top of the milk. In such case an auxiliary cap 296 may be provided on the outlet valve 217 of the can cover to build up higher pressure in the space above the milk, the amount of excessive pressure being determined by a second similar valve 217' on the auxiliary cap 296.

The exemplifications of the invention described above were developed in order to provide a practical milk dispensing device which will maintain the milk at a uniform consistency and keep it free from contamination while it is stored and when dispensed. However, the features of the invention are not limited to milk dispensing devices, but are applicable to devices for dispensing other liquids that will suggest themselves to those skilled in the art and the term "emulsion-like liquid" as used herein is intended to include liquids containing separable substances which tend to separate from the liquid and require a substantial agitation of the liquid for maintaining the liquid at uniform consistency. It is accordingly desired that the appended claims be given a broad construction commensurate with the scope of the invention.

We claim:

1. In a device for dispensing an emulsion-like liquid, a liquid dispensing head having a discharge duct with a discharge opening for delivering liquid flowing through said discharge duct into said opening, operating means for said dispensing head including a gaseous energy source, and electrically actuated control means causing said gaseous energy source to produce either an outflow of liquid through said discharge duct by way of said discharge opening or a reversed flow of gas of sufficient energy through said discharge duct into said liquid, said gaseous energy source being proportioned to deliver gas of sufficient gaseous energy and said duct having sufficiently low flow resistance for producing with the gas discharged into said liquid an agitating motion of the liquid restoring a substantially uniform consistency of said liquid.

2. In a device for dispensing an emulsion-like liquid, a liquid dispensing head having a discharge duct with a discharge opening and a supply tube joined to said discharge duct for delivering liquid flowing through said tube into said discharge opening, operating means for said dispensing head including a gaseous energy source, and electrically actuated control means causing said gaseous energy source to produce either an outflow of liquid through said discharge duct by way of said discharge opening or a reversed flow of gas of sufficient energy through said discharge duct into said liquid, said gaseous energy source being proportioned to deliver gas of sufficient gaseous energy and said duct having sufficiently low flow resistance for producing with the gas discharged into said liquid an agitating motion of the liquid restoring a substantially uniform consistency of said liquid.

3. In a device for dispensing an emulsion-like liquid, a liquid dispensing head having a straight discharge duct with a discharge opening and a straight downwardly extending supply tube joined to said discharge duct for delivering liquid flowing through said tube into said discharge opening, operating means for said dispensing head including a gaseous energy source, and electrically actuated control means causing said gaseous energy source to produce either an outflow of liquid through said discharge duct by way of said discharge opening or a reversed flow of gas of sufficient energy through said discharge duct into said liquid, said gaseous energy source being proportioned to deliver gas of sufficient gaseous energy and said duct having sufficiently low flow resistance for producing with the gas discharged into said liquid an agitating motion of the liquid restoring a substantially uniform consistency of said liquid.

4. In a device for dispensing an emulsion-like liquid, a liquid dispensing head having a straight discharge duct with a discharge opening and a straight downwardly extending supply tube joined to said discharge duct for delivering liquid flowing through said tube into said discharge opening, said duct and said tube having a joint accessible for exposing the interior passages thereof, operating means for said dispensing head including a gaseous energy source, and electrically actuated control means causing said gaseous energy source to produce either an outflow of liquid through said discharge duct by way of said discharge opening or a reversed flow of gas of sufficient energy through said discharge duct into said liquid, said gaseous energy source being proportioned to deliver gas of sufficient gaseous energy and said duct having sufficiently low flow resistance for producing with the gas discharged into said liquid an agitating motion of the liquid restoring a substantially uniform consistency of said liquid.

5. In a device for dispensing an emulsion-like liquid, a container for a liquid having a removable cover thereon, enclosure means on the top of said cover, a liquid dispensing head having a discharge duct with a discharge opening for delivering liquid flowing through said discharge duct into said opening, operating means for said dispensing head including a gaseous energy source, and electrically operated control means causing said gaseous energy source to produce either an outflow of liquid through said discharge duct by way of said discharge opening or a reversed flow of gas of sufficient energy through said discharge duct into said liquid, said gaseous energy source being proportioned to deliver gas of sufficient gaseous energy and said duct having sufficiently low flow resistance for producing with the gas discharged into said liquid an agitating motion of the liquid restoring a substantially uniform consistency of said liquid, said dispensing head being shaped to permit movement thereof between a position within the space of said enclosure and an elevated dispensing position above said enclosure, said discharge duct being slidably mounted on said cover and having a tubular extension to the bottom portion of said container.

6. In a device for dispensing an emulsion-like liquid, a liquid dispensing head having a discharge duct with a discharge opening for delivering liquid flowing through said discharge duct into said opening, operating means for said dispensing head including a gaseous energy source, and electrically actuated control means having valve means establishing a passage for discharging gas from said gaseous energy source through said discharge duct into said liquid with sufficient energy for agitating said liquid, said valve means being movable to a dispensing position establishing a passage for applying energy supplied by said gas pressure means to cause a reversed flow of said liquid through said discharge duct into said discharge opening, said gaseous energy source being proportioned to deliver gas of sufficient gaseous energy and said duct having sufficiently low flow resistance for producing with the gas discharged into said liquid an agitating motion of the liquid restoring a substantially uniform consistency of said liquid.

7. In a device for dispensing an emulsion-like liquid, a liquid dispensing head having a discharge duct with a discharge opening for delivering liquid flowing through said discharge duct into said opening, operating means for said dispensing head including gas pump means having a suction inlet and a pressure outlet, a gas filter at said suction inlet, and electrically operated control means having valve means establishing a passage for discharging gas from the pressure outlet of said gas pump means through said discharge duct into said liquid to agitate said liquid, said valve means being movable to a dispensing position establishing a passage for connecting the suction inlet of said gas pump means to said pressure duct to cause a reversed flow of said liquid through said discharge duct into said discharge opening.

8. In a device for dispensing an emulsion-like liquid, a container for a liquid having a removable cover thereon, enclosure means on the top of said cover, a liquid dispensing head having a straight discharge duct with a discharge opening and a straight downwardly extending supply tube joined to said discharge duct for delivering liquid flowing through said tube into said discharge opening, said duct and said tube having a joint accessible for exposing the interior passages thereof, operating means for said dispensing head including a gaseous energy source, and electrically actuated control means causing said gaseous energy source to produce either an outflow of liquid through said discharge duct by way of said discharge opening or a reversed flow of gas of sufficient energy through said discharge duct into said liquid, said gaseous energy source being proportioned to deliver gas of sufficient gaseous energy and said duct having sufficiently low flow resistance for producing with the gas discharged into said liquid an agitating motion of the liquid restoring a substantially uniform consistency of said liquid, said dispensing head being shaped to permit movement thereof between a position within the space of said enclosure and an elevated dispensing position above said enclosure, said discharge tube being slidably mounted on said cover and having a tubular extension to the bottom portion of said container.

9. In a device for dispensing an emulsion-like liquid, a container for a liquid having a cover thereon, enclosure means on said cover, a liquid dispensing head having a discharge duct with a discharge opening for delivering liquid flowing through said discharge duct into said opening, operating means for said dispensing head including a gaseous energy source, electrically operated control means causing said gaseous energy source to produce either an outflow of liquid through said discharge duct by way of said discharge opening or a reversed flow of gas through said discharge duct into said liquid agitating said liquid, said dispensing head being shaped to permit movement thereof between a position within the space of said enclosure and an elevated dispensing position above said enclosure, said discharge duct being slidably mounted on said cover and having a tubular extension to the bottom portion of said container, and a coupling member detachably interfitting with said dispensing head for establishing detachable connections between said operating means and said dispensing head for operation of said control means.

10. In a device for dispensing an emulsion-like liquid, a liquid dispensing head having a discharge duct with a discharge opening for delivering liquid flowing through said discharge duct into said opening, operating means for said dispensing head including a gaseous energy source, electrically actuated control means causing said gaseous energy source to produce either an outflow of liquid through said discharge duct by way of said discharge opening or a reversed flow of gas through said discharge duct into said liquid agitating said liquid, and periodically actuated means for periodically producing a flow of gas of sufficient energy through said duct into said liquid, said gaseous energy source being proportioned to deliver gas of sufficient gaseous energy and said duct having sufficiently low flow resistance for producing with the gas discharged into said liquid an agitating motion of the liquid restoring a substantially uniform consistency of said liquid.

11. In a device for dispensing an emulsion-like liquid, a liquid dispensing head having a discharge duct with a discharge opening for delivering liquid flowing through said discharge duct into said opening, operating means for said dispensing head including a gaseous energy source, electrically actuated control means causing said gaseous energy source to produce either an outflow of liquid through said discharge duct by way of said discharge opening or a reversed flow of gas through said discharge duct into said liquid agitating said liquid, and cut-off means actuated at a predetermined stage of the discharge of the liquid from said discharge opening for stopping the flow of said liquid.

12. In a device for dispensing an emulsion-like liquid, a liquid dispensing head having a discharge duct with a discharge opening for delivering liquid flowing through said discharge duct into said opening, operating means for said dispensing head including a gaseous energy source, electrically actuated control means having valve means establishing a passage for discharging gas supplied by said gaseous energy source through said discharge duct into said liquid to agitate said liquid, said valve means being movable to a dispensing position establishing a passage for applying energy supplied by said gaseous energy source to cause a reversed flow of said liquid through said discharge duct into said discharge opening, and cut-off means actuated at a predetermined stage of the discharge of the liquid from said discharge opening for stopping the flow of said liquid.

13. In a device for dispensing an emulsion-like liquid, a liquid dispensing head having a discharge duct with a discharge opening for delivering liquid flowing through said discharge duct into said opening, operating means for said dispensing head including a gaseous energy source, control means causing said gaseous energy source to produce either an outflow of liquid through said discharge duct by way of said discharge opening or a reversed flow of gas through said discharge duct into said liquid agitating said liquid, an electric flow actuating circuit for operating said control means having normally open circuit-energizing contact means producing flow of said liquid through said discharge opening upon energization of said circuit, and cut-off means for de-energizing said flow actuating circuit, said cut-off means having a normally open actuating circuit energized at a predetermined stage of the discharge of said liquid from said discharge opening.

14. In a device for dispensing an emulsion-like liquid, a liquid dispensing head having a discharge duct with a discharge opening for delivering liquid flowing through said discharge duct into said opening, operating means for said dispensing head including a gaseous energy source, control means having valve means establishing a passage for discharging gas supplied by said gaseous energy source through said discharge duct into said liquid to agitate said liquid, said valve means being movable to a dispensing position establishing a passage for applying energy supplied by said gaseous energy source to cause a reversed flow of said liquid through said discharge duct into said discharge opening, an electric flow actuating circuit for operating said control means having normally open circuit-energizing contact means producing flow of said liquid through said discharge opening upon energization of said circuit, and cut-off means for de-energizing said flow actuating circuit, said cut-off means having a normally open actuating circuit energized at a predetermined stage of the discharge of said liquid from said discharge opening.

15. In a device for dispensing an emulsion-like liquid, a liquid dispensing head having a discharge duct with a discharge opening for delivering liquid flowing through said discharge duct into said opening, operating means for said dispensing head including a gaseous energy source, control means causing said gaseous energy source to produce either an outflow of liquid through said discharge duct by way of said discharge opening or a reversed flow of gas through said discharge duct into said liquid agitating said liquid, an electric flow actuating circuit for operating said control means having normally open circuit-energizing contact means producing flow of said liquid through said discharge opening upon energization of said circuit, and cut-off means for de-energizing said flow actuating circuit, said cut-off means having a normally open actuating circuit energized at a predetermined stage of the discharge of said liquid from said discharge opening by a conducting connection established by said liquid.

16. In a device for dispensing an emulsion-like liquid, a liquid dispensing head having a discharge duct with a discharge opening for delivering liquid flowing through said discharge duct into said opening, operating means for said dispensing head including a gaseous energy source, control means causing said gaseous energy source to produce either an outflow of liquid through said discharge duct by way of said discharge opening or a reversed flow of gas through said discharge duct into said liquid agitating said liquid, an electric flow actuating circuit for operating said control means having normally open circuit-energizing contact means producing flow of said liquid through said discharge opening upon energization of said circuit, and cut-off means for de-energizing said flow actuating circuit, said cut-off means having a normally open actuating circuit energized at a predetermined stage of the discharge of said liquid from said discharge opening by a conducting connection established by the level of said liquid.

17. In a device for dispensing an emulsion-like liquid, a liquid dispensing head having a discharge duct with a discharge opening for delivering liquid flowing through said discharge duct into said opening, operating means for said dispensing head including a gaseous energy source, control means having valve means establishing a passage for discharging gas supplied by said gaseous energy source through said discharge duct into said liquid to agitate said liquid, said valve means being movable to a dispensing position establishing a passage for applying energy supplied by said gaseous energy source to cause a reversed flow of said liquid through said discharge duct into said discharge opening, an electric flow actuating circuit for operating said control means having normally open circuit-energizing contact means producing flow of said liquid through said discharge opening upon energization of said circuit, and cut-off means for de-energizing said flow actuating circuit, said cut-off means having a normally open actuating circuit energized at a predetermined stage of the discharge of said liquid from said discharge opening by a conducting connection established by the level of said liquid.

18. In a device for dispensing an emulsion-like liquid, a liquid dispensing head having a discharge duct with a discharge opening for delivering liquid flowing through said discharge duct into said opening, operating means for said dispensing head including gas pump means, control means having valve means establishing a passage for discharging gas supplied by said gas pump means through said discharge duct into said liquid to agitate said liquid, said valve means being movable to a dispensing position establishing a passage for applying energy supplied by said gas pump means to cause a reversed flow of said liquid through said discharge duct into said discharge opening, an electric flow actuating circuit for operating said control means and said gas pump means having normally open circuit-energizing contact means producing flow of said liquid through said discharge opening upon energization of said circuit, and cut-off means for de-energizing said flow actuating circuit, said cut-off means having a normally open actuating circuit energized at a predetermined stage of the discharge of said liquid from said discharge opening by a conducting connection established by said liquid.

19. In a device for dispensing an emulsion-like liquid, a liquid dispensing head having a discharge duct with a discharge opening for delivering liquid flowing through said discharge duct into said opening, operating means for said dispensing head including gas pump means, control means having valve means establishing a passage for discharging gas supplied by said gas pump means through said discharge duct into said liquid to agitate said liquid, said valve means being movable to a dispensing position establishing a passage for applying energy supplied by said gas pump means to cause a reversed flow of said liquid through said discharge duct into said discharge opening, an electric flow actuating circuit for operating said control means and said gas pump means having normally open circuit-energizing contact means producing flow of said liquid through said discharge opening upon energization of said circuit, and cut-off means for de-energizing said flow actuating circuit, said cut-off means having a normally open actuating circuit energized at a predetermined stage of the discharge of said liquid from said discharge opening by a conducting connection established by the level of said liquid.

20. In a device for dispensing an emulsion-like liquid, a liquid dispensing head having a discharge duct with a discharge opening for delivering liquid flowing through said discharge duct into said opening, operating means for said dispensing head including gas pump means having a suction inlet and a pressure outlet, a gas filter at said suction inlet, control means having valve means establishing a passage for discharging gas from the pressure outlet of said gas pump means through said discharge duct into said liquid to agitate said liquid, said valve means being movable to a dispensing position establishing a passage for connecting the suction inlet of said gas pump means to said pressure duct to cause a reversed flow of said liquid through said discharge duct into said discharge opening, an electric flow actuating circuit for operating said control means and said gas pump means having normally open circuit-energizing contact means producing flow of said liquid through said discharge opening upon energization of said circuit, and cut-off means for de-energizing said flow actuating circuit, said cut-off means having a normally open actuating circuit energized at a predetermined stage of the discharge of said liquid from said discharge opening by a conducting connection established by the level of said liquid.

21. In a liquid dispensing device, a liquid dispensing head having a discharge duct with a discharge opening, operating means for said dispensing head including a gaseous energy source, electrically actuated control means causing said gaseous energy source to produce an outflow of liquid through said discharge duct by way of said discharge opening, and electrical cut-off means including a circuit portion formed by the discharged liquid actuated at a predetermined stage of the discharge of the liquid from said discharge opening for stopping the flow of said liquid.

22. In a liquid dispensing device, a liquid dispensing head having a discharge duct with a discharge opening, operating means for said dispensing head including a gaseous energy source, control means causing said gaseous energy source to produce an outflow of liquid through said discharge duct by way of said discharge opening, an electric flow actuating circuit for operating said control means having normally open circuit-energizing contact means producing flow of said liquid through said discharge opening upon energization of said circuit, and cut-off means for de-energizing said flow actuating circuit, said cut-off means having a normally open actuating circuit energized at a predetermined stage of the discharge of said liquid from said discharge opening.

WILLIAM TAMMINGA.
OTTORINO BONOMI.
ROBERT E. CORRADINI.
HOWARD M. JONES.